Nov. 25, 1930.  R. W. JANDA  1,782,572
CLUTCH
Filed June 25, 1928   4 Sheets-Sheet 2

PRIOR TYPE

Inventor
Rudolph W. Janda
By Brown, Jackson, Boettcher & Diener
Attys

Nov. 25, 1930.  R. W. JANDA  1,782,572
CLUTCH
Filed June 25, 1928   4 Sheets-Sheet 3
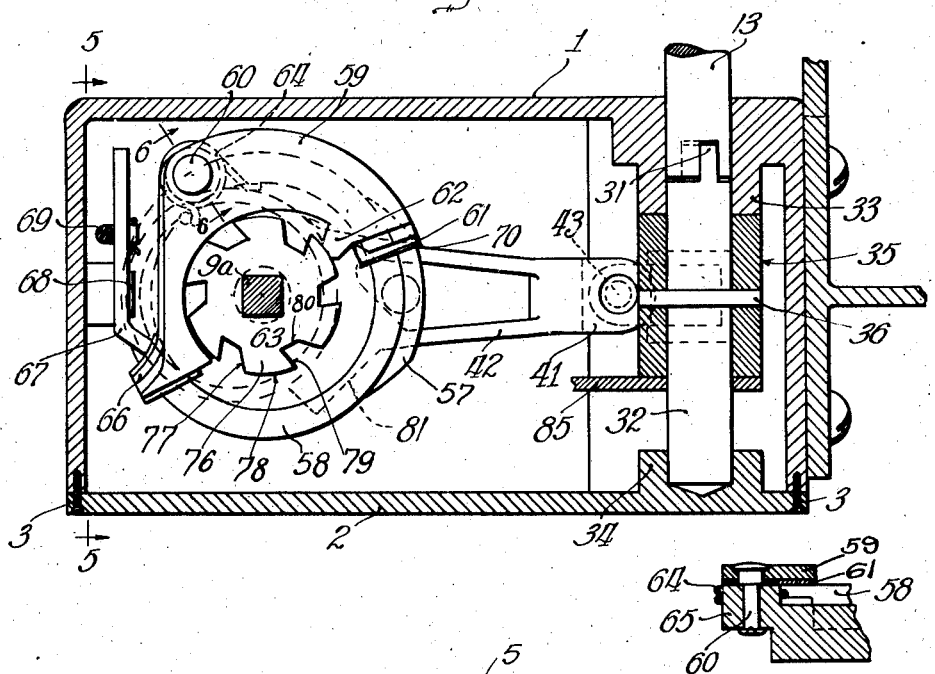
Fig. 4.
Fig. 6.
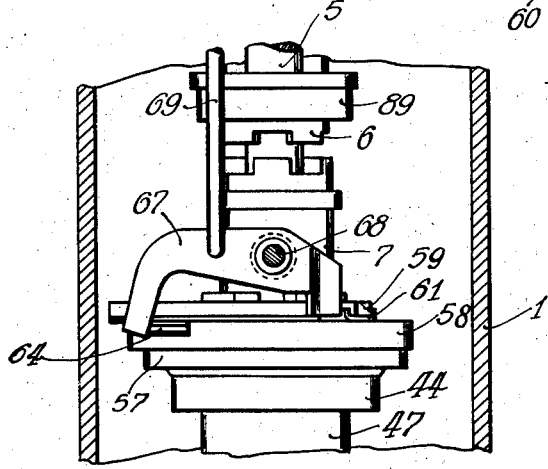
Fig. 5.
Inventor
Rudolph W. Janda
By Brown, Jackson, Boettcher & Dienner
Att'ys Nov. 25, 1930. R. W. JANDA 1,782,572
CLUTCH
Filed June 25, 1928 4 Sheets-Sheet 4
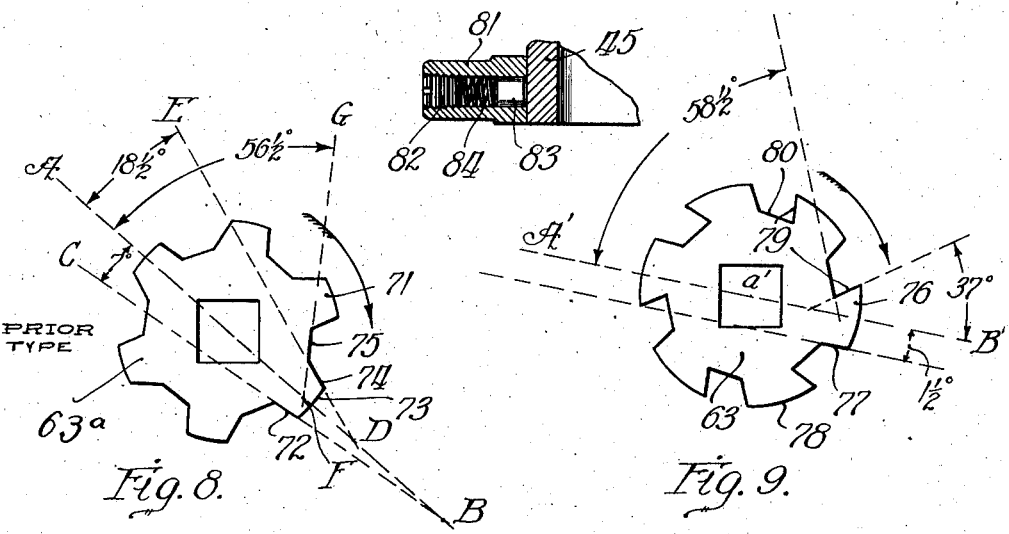
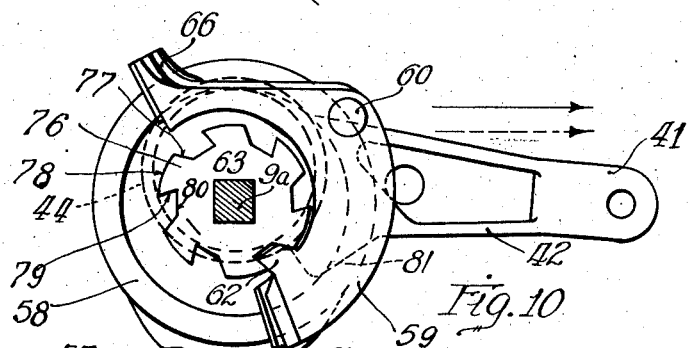
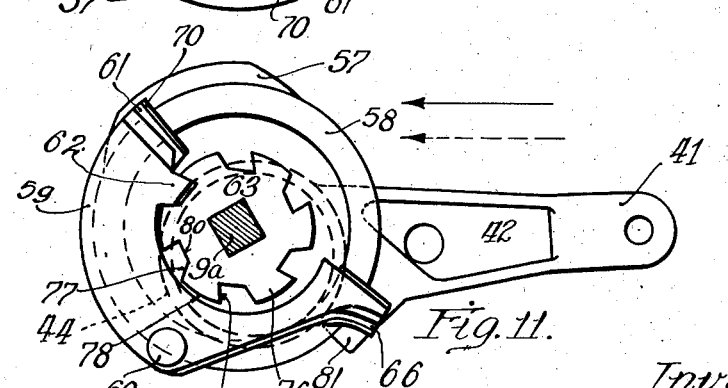
Inventor
Rudolph W. Janda
By Brown, Jackson, Boettcher & Dienner
Attys Patented Nov. 25, 1930

1,782,572

UNITED STATES PATENT OFFICE

RUDOLPH W. JANDA, OF BERWYN, ILLINOIS, ASSIGNOR TO CONLON CORPORATION, OF CICERO, ILLINOIS, A CORPORATION OF ILLINOIS

CLUTCH

Application filed June 25, 1928. Serial No. 288,154.

This invention relates to clutches, and more particularly to a clutch and a clutch element for use in ironing machines and other machines in which parts are operated by an eccentric or equivalent means, the parts operated exerting a reactive pressure which tends to declutch the members of the clutch.

My invention is particularly adapted to be applied to a driven shaft and an eccentric associated with the shaft but unsecured thereto, this eccentric being mounted to rotate with the shaft when clutched to the same. This eccentric is connected to the shoe of an ironing machine for moving the same toward and away from the roll, the connections being such that the eccentric is subjected to supplemental forces which tend to cause the eccentric to overrun the shaft. One of the main objects of my invention is to provide efficient and inexpensive means for clutching the eccentric to the shaft for rotation therewith while preventing the eccentric from overrunning the shaft, such means being capable of being readily declutched as desired and at predetermined times for holding the shoe in adjustment.

A further object is to provide a clutch element, adapted to be mounted upon the driven shaft for rotation therewith and so constructed as to cooperate with the tooth of a pawl for clutching such elements and the eccentric together while effectively preventing disengagement of the pawl tooth from the clutch element due to the tendency of the eccentric to overrun the shaft. Further objects and advantages of my invention will appear from the detailed description.

In the drawings:

Fig. 4 is a section through the gear casing taken substantially on line 4—4 of Fig. 1;

Fig. 5 is a section taken substantially on line 5—5 of Fig. 4;

Fig. 6 is a fragmentary section taken substantially on line 6—6 of Fig. 4;

Fig. 7 is a fragmentary section through the eccentric strap and the eccentric, partly in elevation;

Fig. 8 is a plan view of the present type of star wheel illustrated in Fig. 3, on an enlarged scale;

Fig. 9 is a plan view, on an enlarged scale, of the improved form of star wheel illustrated in Fig. 4;

Fig. 10 is a plan view of the eccentric, star wheel, and associated parts showing their relative positions after the ironing shoe has been moved from open or inoperative position approximately the distance required to position the shoe closely adjacent the roll, but not under pressure;

Fig. 11 is a plan view of the eccentric, star wheel, and associated parts showing their relative positions after the eccentric has been turned through approximately 60 degrees in shoe opening direction.

Figure 1:
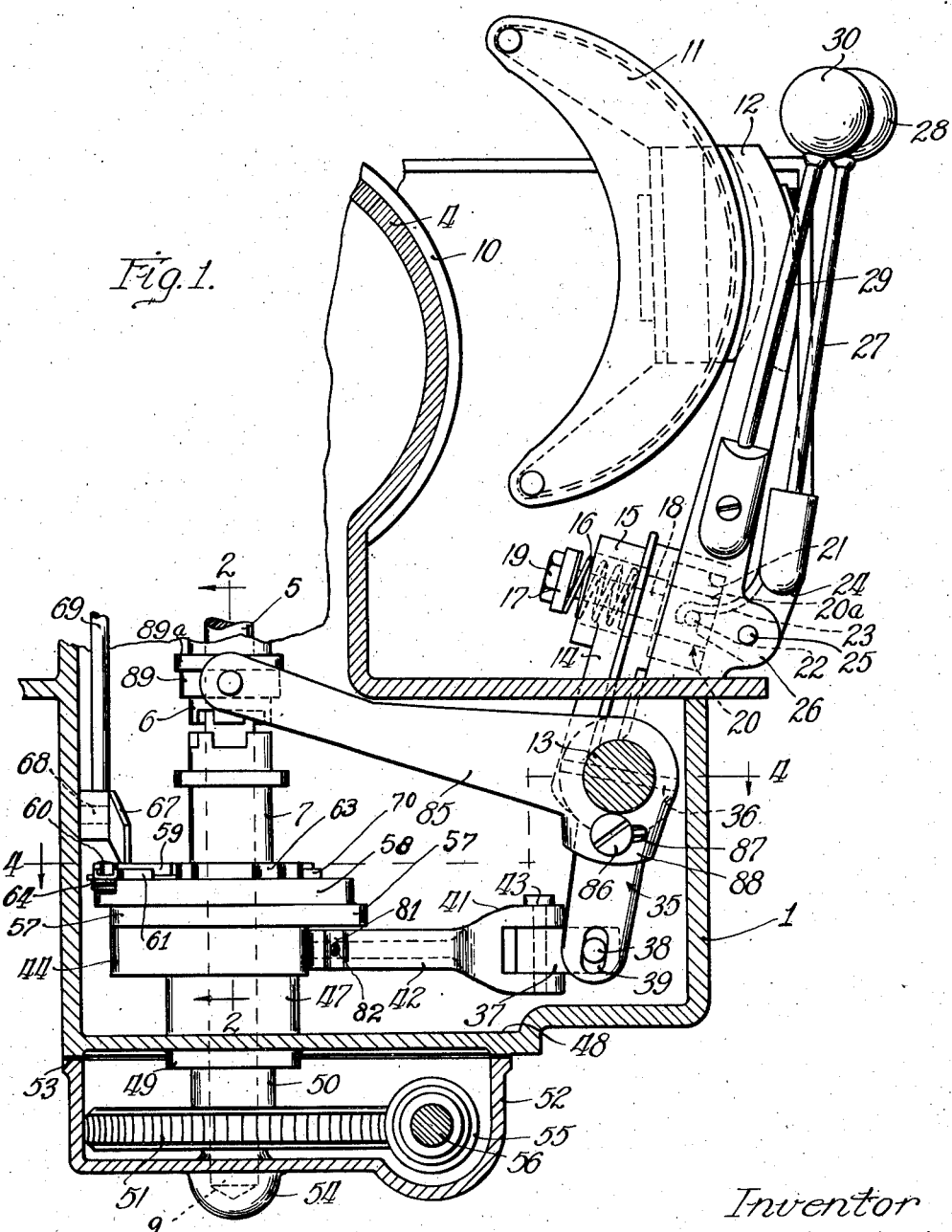
Fig. 1 is a sectional view through a gear casing and associated parts of an ironing machine showing my invention as applied, parts being shown in elevation.

I have illustrated my invention as applied to an ironing machine such as that disclosed in the copending application of Carl F. Anderson and Rudolph W. Janda, Serial No. 241,333, filed December 20, 1927. In the instant application, I have shown only such parts of the ironing machine as are required to bring out the operation of the present invention.

The ironing machine includes a suitably shaped gear casing 1, the outer side of which is closed by a removable cover or plate 2 secured in position by screws 3, or in any other suitable manner. Casing 1 is extended upwardly and is provided with an upper approximately cylindrical supplemental casing 4.

This casing houses appropriate gearing (not shown), driven by a stub shaft 5 upon which is feathered a clutch member 6 which cooperates with a clutch member 7 secured, as by a pin 8, upon the upper end of a drive shaft 9. The gearing in the supplemental casing 4 is suitably connected to an ironing roll 10 for rotating the latter, this roll being rotatably supported in a known manner.

An ironing shoe 11 is provided with a concave face which cooperates with the roll for ironing articles passed between the roll and the shoe, in a known manner. This shoe is supported by an arm 12 the lower portion of which is bifurcated and is loosely mounted upon an operating shaft 13 rockably mounted, in a suitable manner, in the frame of the machine. The lower portion of arm 12 straddles an arm 14 which is secured, at its lower end, to shaft 13. At its upper end arm 14 is provided with a suitable receptacle or socket 15 which receives an expansion coil spring 16. This spring is confined between an abutment member or washer 17 and the inner end or base of the socket 15. An eye bolt 18 passes through spring 16 with its head 19 bearing against the outer face of washer 17. At its other end, this bolt is provided with an eye 20 which is slidable through the upper end of arm 14 and projects into a relatively large recess opening from the rear face of this arm. In practice, the eye bolt is formed in two parts, one part comprising a bolt which screws into the eye member 20, and the eye or connecting member 20 comprising a hub or body portion which fits snugly in an opening in arm 14 and receives the screw threaded portion of the bolt, and a U-shaped portion which projects into recess 21.

This U-shaped portion 20ª receives a pin 22 secured in and extending transversely of portion 20ª. This pin is engaged by the bill of a hook element 23 of a latch member 24 rockably mounted on a pin 25 secured, at its ends, in spaced ears 26 projecting from arm 12. A rod 27 is suitably secured at its lower end in latch member 24 and is provided at its upper end with a knob 28 disposed to be readily accessible from the front of the ironing machine. A lever 29 is also secured to arm 12 and is provided at its upper end with a suitable knob 30. The latch 24 and associated parts provide means whereby the shoe arm 12 is normally secured to the operating arm 14 for movement therewith but can be quickly released from the operating arm by swinging the upper end of the lever 27 rearwardly so as to disengage the latch 24 from pin 22. The lever 29 provides means for moving the shoe 11 toward and away from the roll 10 when the shoe arm is released from the operating arm 14.

Shaft 13 is suitably connected at its outer end, as by a tongue and slot connection 31, to a stub shaft 32 rotatably supported in bosses 33 and 34 of casing 1 and cover plate 2, respectively, boss 33 also providing a support for the outer end of shaft 13. An arm 35 is suitably secured, as by means of a pin 36, to stub shaft 32 and depends therefrom. This arm is of bifurcated construction and, at its lower end, receives the outer end of a block 37 thru which is secured a horizontal pin 38, the ends of which project through slots 39 in the spaced side elements of arm 35. The inner end of the block 37 fits into a horizontally disposed fork 41 at the outer end of a connecting rod 42, and is pivotally secured in the fork on a vertical axis by a pin 43. The connecting rod 42 is provided, at its other end, with an eccentric strap 44 which fits about an eccentric 45 mounted for rotation upon a bushing 46 thru which the drive shaft 9 is mounted.

This bushing extends through a boss 47 projecting upwardly from the bottom wall 48 of the gear casing 1, and is provided at its lower end with an outwardly extending flange 49 which seats upon the upper end of hub 50 of a worm wheel 51 secured upon shaft 9 adjacent the lower end thereof. This worm wheel is disposed within a lower casing or housing 52 which is suitably secured to bottom wall 48 of gear casing 1, a suitable gasket being interposed between housing 52 and wall 48. This gasket is designated 53. The lower end of shaft 9 seats in a boss 54 formed integrally with the bottom wall of housing 52, and is held thereby against downward movement. The worm wheel 51 meshes with a worm 55 secured on a shaft 56 which projects into the housing 52. The shaft 56 may be driven in any suitable manner and, in practice, is the rotor shaft of an electric motor.

Eccentric 45 seats upon the upper end of boss 47 and is provided with an outwardly extending shoulder 57, above the eccentric strap 44, and with a flange 58 extending upwardly from this shoulder. A pawl 59 is rockably mounted, by means of a pin 60, on the upper face of flange 58. This pawl is mounted in a cradle 61, through which the pin 60 also passes, and is provided with a tooth 62 adapted for engagement with a clutch element or star wheel 63 which is mounted upon an upper squared portion 9ª of shaft 9, the star wheel having a central squared opening which snugly receives this squared portion of the shaft. The star wheel is thus connected to the drive shaft for rotation therewith. A wire coil spring 64 is disposed about a lug 65 (Fig. 6) through which pin 60 passes and has one arm bearing against flange 58 and the other arm engaging an abutment or pin extending downwardly from the under face of cradle 61.

This spring acts to yieldingly urge the cradle 61, and consequently the pawl 59, in such direction as to move the tooth 62 into operative or clutching relation to the star wheel 63. The pawl 59 has limited movement relative to the cradle so as to facilitate the engagement and disengagement of tooth 62 with and from the teeth of the star wheel.

The particular construction and mounting of the cradle and pawl is disclosed in my patent for clutch, issued February 28, 1928, Patent No. 1,660,448 and need not be illustrated or described herein in further detail.

Figure 3:
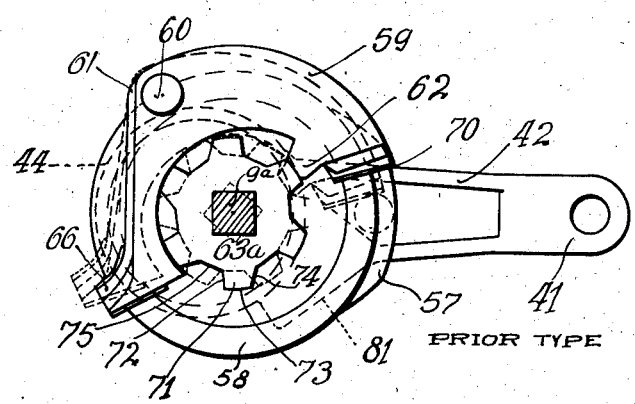
Fig. 3 is a plan view of the eccentric and clutch members and associated parts, the driven shaft being shown in section, showing the present type of clutch element or star wheel used on the driven shaft.

In Fig. 4 of the drawings, I have illustrated my improved construction of star wheel 63 and in Fig. 3, I have illustrated, for purposes of comparison, a form of star wheel 63a formerly used in the clutch mechanism shown. This latter form of star wheel has been found to be unsatisfactory due to the tendency of the eccentric to overrun the driven shaft, previously referred to, since it permits the tooth of the pawl to become disengaged from the star wheel under such conditions. This results in objectionable chattering and, also, under certain unfavorable conditions, seriously interferes with the movement of the ironing shoe into and out of operative and inoperative position.

When the ironing shoe 11 is in its full open or inoperative position illustrated in Fig. 1, the eccentric 45 is on dead center and projects to the left of the shaft 9 as considered in Fig. 4, thus holding the connecting rod 42 against movement toward the right and locking the shoe in open position. As the eccentric reaches this dead center position, end 66 of the cradle 61 contacts with a trip finger 67 pivotally mounted at 68 upon the adjacent wall of the gear casing 1.

This finger has connected thereto an operating rod 69 which, in practice, extends through the top wall of the casing 1 and is provided on its upper end with a button or similar element for convenience in operating this rod. The rod may have associated therewith a spring or equivalent means for normally holding it raised, this rod being so disposed that, when it is in raised position, the trip element of finger 67 is in the path of travel of the cradle 61.

With the parts in the positions illustrated in Fig. 1, to move the ironing shoe 11 into closed or operative position, the rod 69 is depressed. This releases the cradle 61 which is then moved by spring 64 so as to cause tooth 62 of the pawl to engage one of the teeth of the star wheel 63. This couples the eccentric to shaft 9 for rotation therewith. The shaft 9 is rotated in a clockwise direction, when viewed from above, the eccentric being similarly rotated when coupled or clutched to the shaft. This turning of the eccentric causes movement of the connecting rod 42 toward the right, as considered in Fig. 4 and moves the shoe toward the roll. By the time the eccentric has been turned through approximately 90 degrees, into the position illustrated in Fig. 10, the ironing shoe 11 has been moved toward the roll 10 well beyond center position so that the weight of this shoe and the associated parts act, by gravity, to pull the arm 42 toward the right. This materially accelerates the movement of the arm, due to the position of the eccentric at this time, with the result that the eccentric tends to overrun the shaft since the movement or action of the force or pull applied to the rod 42 is in the same direction as the movement imparted to this rod by the eccentric.

This will be clear from Figure 10 in which the direction in which the force applied to the arm or rod 42 by the eccentric acts is indicated by the full line arrow and the direction in which the accelerating force applied to the rod 42 by the pull of the shoe and associated parts acts is indicated by the dotted line arrow. It will be noted that both of these forces act in the same direction. Under such conditions, and in view of the fact that the eccentric at this time is midway between its two dead center positions, the eccentric will tend to overrun the shaft 9.

If it be assumed that the ironing shoe 11 is in full closed position against the roll, the eccentric 45 will be in dead center position but extending to the right of shaft 9 as considered in Fig. 4, that is, the eccentric will occupy the opposite position to that illustrated in Fig. 4 and, as the shoe reaches full operative position, the other end 70 of the cradle contacts with the trip element of trip finger 67 thus disengaging the tooth 62 of the pawl from the star wheel. Upon depression of rod 69, the pawl is released and the eccentric is clutched to the shaft 9 for rotation therewith. At this time the spring 16 is under compression, the greater portion of the last 90 degrees of movement of the eccentric in shoe closing direction being utilized for compressing this spring. As the eccentric turns with the shaft in a clockwise direction beyond said dead center position, the connecting rod 42 is moved toward the left as considered in Fig. 4 by the eccentric. The force applied to this rod by the eccentric is supplemented by the one applied to the rod by the reaction of spring 16 through arms 14 and 35 and the shaft 13.

As the eccentric moves in a clockwise direction out of dead center position, the force due to the reaction of spring 16 becomes increasingly effective until the eccentric has been turned through approximately 45 degrees. At this time, the force exerted by the spring has a very noticeable effect which, with the form of star wheel formerly used and illustrated in Figs. 3 and 8, causes the eccentric to overrun the star wheel.

In the form of star wheel illustrated in Figs. 3 and 8, the teeth 71 taper outwardly in width and the leading edge or face 72 of the respective teeth is disposed at an angle of approximately 7 degrees to the radius A. B. which bisects the outer edge or face 73 of the tooth. The following edge or face 74 of the tooth is disposed at an angle of approximately 18½ degrees to the radius A. B. and the outer face of the fillet 75 is disposed at an angle of approximately 56½ degrees to the radius A. B. It will be noted that the vertices of the angles A, B, C and A, D, E, are located outside of the periphery of the wheel, the angle A, F, G, being the only one of the three angles referred to having its vertex within the periphery of the wheel. With a star wheel constructed in this manner, when a supplemental force is applied to the connecting rod either by the reaction of spring 16 or by the weight of the shoe 11 and associated parts, in the manner above noted, the eccentric is moved forward slightly in advance of the shaft 9 with the result that the tooth 62 contacts with the inclined following edge or face 74 of the adjacent tooth 73 of the star wheel.

Since the face 74 is inclined outwardly away from the tooth 62, this tooth readily slides up the face onto the outer face 73 of tooth 71. In this manner, the tooth 62 of the pawl may pass over several of the teeth of the star wheel with the result that the pawl actually overruns the star wheel seriously interfering with the proper operation of the machine.. In some cases, particularly where the strap 44 does not fit snugly about the eccentric, objectionable chattering results and it may even become impossible to operate the ironing shoe. This latter result, however, is probably due to the looseness of the eccentric strap, which will be discussed more fully later on, rather than to the overrunning of the star wheel by the eccentric. The overrunning of the star wheel by the eccentric is, however, objectionable as causing chattering and preventing prompt and accurate operation of the ironing shoe.

I have found, by properly constructing the star wheel, it is possible to prevent both overrunning of the wheel by the pawl and to prevent disengagement of the tooth of the pawl from the star wheel, with consequent failure to operate the shoe, even when the strap of the connecting rod 42 is loose about the eccentric 45. The new form of star wheel constructed in accordance with my invention is illustrated in Figs. 4 and 9.

Referring to Fig. 9, the star wheel 63 is provided with a plurality of teeth 76. The leading edge or face 77 of each tooth is disposed substantially parallel to the radius A' B' which bisects the outer face or edge 78 of the tooth, the angle between this radius and the leading edge or face 77 being but 1½ degrees and being opposite to the angle A, B, C of Fig. 8.

The following edge 79 of tooth 76 is disposed at an angle of approximately 37 degrees to the radius A' B' and the vertex of this angle is disposed within the periphery of the wheel. The outer face of the fillet 80 is disposed at an angle of 58½ degrees to the radius A' B' or approximately at the same angle as the outer face of the fillet of the wheel of Fig. 8. By constructing the wheel in the manner illustrated in Fig. 9, the following edges of the teeth are of substantially hooked shape and the leading edge 77 of each tooth is substantially parallel to the radius bisecting such tooth. As a result, the edge or surface 77 of the tooth contacts with the cooperating edge or surface of tooth 62 of the pawl throughout the entire depth thereof assuring proper clutching of the pawl to the star wheel under the most adverse operating conditions; that is, under conditions where the strap of the connecting rod 42 is loose about the eccentric. The hook shaped following edges of the teeth 76 effectively prevent overrunning of the wheel by the pawl. In the event that the eccentric should be moved slightly in advance of the star wheel, due to reaction exerted on the rod 42 in the manner previously described, the forward edge of tooth 62 contacts with the following edge of tooth 76 and directs tooth 62 downwardly and inwardly of the wheel since edge 79 is inclined downwardly and inwardly of the wheel. This renders it impossible for the pawl tooth to pass out of contact with the wheel and accordingly effectively prevents overrunning of the wheel by the pawl, thus assuring accuracy in operation of the shoe and eliminating chattering of the pawl tooth on the teeth of the wheel.

To eliminate undesirable looseness or play between the eccentric and the strap of rod 42, I provide improved means whereby the strap is held snugly about the eccentric at all times without binding thereon.

Such means is desirable as providing an automatic take-up for any wear while preventing binding between the eccentric and the strap due to the latter fitting too tightly about the eccentric. Referring to Fig. 7, I provide a lug 81 at the junction between the rod 42 and the strap 45. This lug is bored, and threaded at its outer portion for reception of a screw plug 82. A plunger 83 is slidably mounted in the inner end of the bore and bears against the peripheral surface of the eccentric 45. An expansion coil spring 84 is confined between the plug and the plunger. By adjusting plug 82 the compression of the spring may be varied thus varying the pressure exerted by the plunger upon the eccentric. The area of contact between the plunger and the eccentric is relatively small so that there is no undesirable binding between the eccentric and the strap therefor. On the other hand, there is a desirable frictional contact between the members which serves to counteract, to a great extent, the reaction forces to which the connecting rod is subjected, since such forces, to be effective upon the eccentric, would have to overcome this frictional contact between the eccentric and the strap. While this feature is not of great importance in using the improved form of star wheel illustrated in Fig. 9, it is desirable as assuring smoothness of operation at all times. The frictional contact between the strap and the eccentric is, however, important when using the star wheel such as that illustrated in Fig. 8. Under such conditions, if the eccentric is loose in the strap 44, the forces which react on the connecting rod 42 can readily turn the eccentric so as to cause the pawl to overrun the star wheel or, in some instances, cause the tooth of the pawl to move outwardly against the action of spring 64 out of contact with the teeth of the star wheel.

When this occurs the shoe cannot be moved into operative position or vice versa. It will thus be seen that the means for assuring proper contact between the eccentric and its strap at all times is of considerable importance.

An arm 85 is loosely mounted, at its lower end, upon stub shaft 32 and is connected to the hub of arm 35 by means of a screw 86 threading into the hub of arm 35 and passing through a slot 87 in a finger 88 depending from arm 85. At its upper end arm 85 is connected to a collar 89 which extends about the clutch member 6 beneath a flange 89ª thereof, the collar being loose on member 6. Upon movement of the shoe into open or inoperative position, arm 85 is raised and raises the clutch member 6 out of engagement with the clutch member 7 thus stopping operation of the roll 10. Upon movement of the shoe into operative relation to the roll, the upper end of arm 85 and the clutch member 6 are lowered by gravity thus setting the roll into operation. The pin and clutch connection between arms 85 and 35 is to permit the clutch member 6 to be held in raised or inoperative position, in a suitable manner, when the shoe is moved into operative relation to the roll thus preventing rotation of the roll at such times. In the copending application of Carl F. Anderson and Rudolph W. Janda, above identified, suitable means is illustrated and described for holding the clutch member 6 in inoperative position when desired. Such means forms no part of the present invention and need not be illustrated nor described herein in detail.

Figure 2:
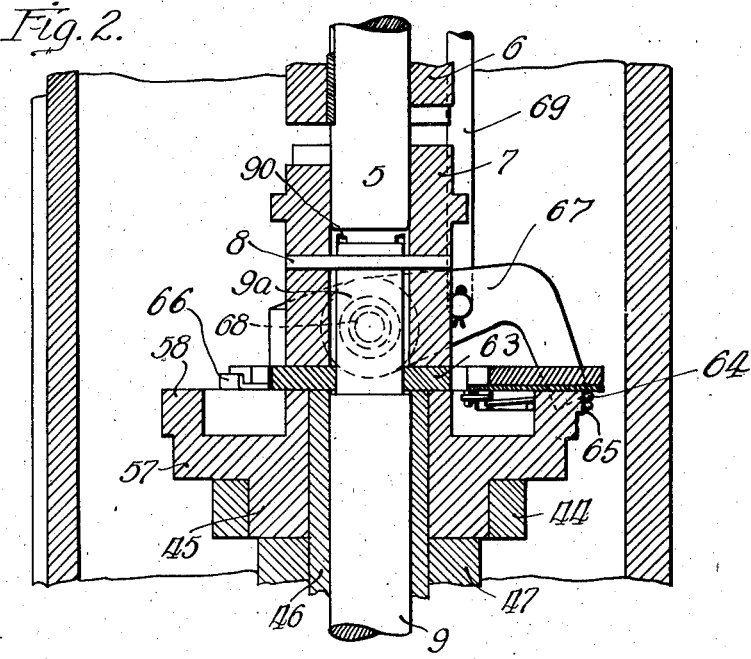
Fig. 2 is a vertical sectional view taken substantially on line 2—2 of Fig. 1.

As will be noted from Fig. 2, the clutch member 7 is provided, in its inner face, with suitably disposed grooves 90 which receive the corner portions of the square portion 9ª of shaft 9.

This serves to establish driving connection between the shaft and the clutch member 7 so that the pin 8 is not essential. This pin may, therefore, be omitted if desired.

What I claim is:

1. In combination, a driving shaft, a clutch member mounted on the shaft for rotation therewith and having outwardly projecting teeth, an eccentric mounted about the shaft and normally free therefrom, an operating arm having a strap fitting about the eccentric, mechanisms connected to said arm and reacting thereon in the direction of movement of the arm in the operation thereof, a pawl rockably mounted on the eccentric and having a clutch tooth adapted for cooperation with the teeth of said clutch member, yielding means urging the pawl into operative relation to the clutch member, and means for moving the pawl into inoperative position and holding it in such position, the following faces of the teeth of the clutch member being inclined outwardly thereof toward the tooth of the pawl and acting to prevent disengagement therefrom of the pawl tooth by the reaction pressure exerted on the arm when said eccentric is moved beyond dead center relative to said arm.

2. In combination, a driving shaft, a clutch member mounted on the shaft for rotation therewith and having outwardly projecting teeth, an eccentric mounted about the shaft and unsecured thereto, means for clutching the eccentric to the shaft including a pawl having a tooth adapted for cooperation with the teeth of the clutch member, an operating arm having a strap fitting about the eccentric, and means exerting pressure on the arm in its direction of movement in operation, the following faces of the teeth of the clutch member being inclined outwardly thereof toward the tooth of the pawl and acting to prevent disengagement therefrom of the pawl tooth by the pressure exerted on the arm.

3. In combination, a uni-directional driving shaft, an eccentric mounted about the shaft and unsecured thereto, a star wheel mounted on the shaft for rotation therewith and having its teeth hooked contra to its direction of rotation, a pawl mounted on the eccentric and having a clutch tooth cooperating with the leading faces of the teeth of the star wheel for clutching the eccentric to said star wheel, yielding means urging the same toward the star wheel, and means operated by the eccentric and exerting pressure thereon tending to cause the eccentric to overrun the star wheel.

4. In combination, a uni-directional driving shaft, an eccentric mounted about the shaft and unsecured thereto, a star wheel mounted on the shaft for rotation therewith, the following faces of the respective teeth of the star wheel being disposed at an angle to that radius of the wheel which bisects the outer face of the tooth and the vertex of such angle being within the periphery of the wheel, a pawl mounted on the eccentric and having a tooth cooperating with the leading faces of the teeth of the wheel for clutching the eccentric to the shaft for rotation therewith, yielding means urging the pawl toward the star wheel, and means operated by the eccentric and exerting pressure thereon tending to cause the eccentric to overrun the star wheel.

5. In combination, a uni-directional driving shaft, an eccentric mounted about the shaft and unsecured thereto, a star wheel mounted on the shaft for rotation therewith, the following faces of the respective teeth of the star wheel being disposed at an angle to that radius of the wheel which bisects the outer face of the tooth and the vertex of such angle being within the periphery of the wheel, a pawl mounted on the eccentric and having a tooth cooperating with the leading faces of the teeth of the wheel for clutching the eccentric to the shaft for rotation therewith, yielding means urging the pawl toward the star wheel, an operating arm having a strap fitting about the eccentric, and mechanisms operated by said arm and exerting pressure thereon in the direction of movement of the arm by the eccentric when the latter is rotated with said shaft.

6. In combination, a uni-directional driving shaft, an eccentric mounted about the shaft and unsecured thereto, a star wheel mounted on the shaft for rotation therewith, the following faces of the respective teeth of the star wheel being disposed at an acute angle to that radius of the wheel which bisects the outer face of the tooth and the vertex of such angle being within the periphery of the wheel, a pawl mounted on the eccentric and having a tooth cooperating with the leading faces of the teeth of the wheel for clutching the eccentric to the shaft for rotation therewith, yielding means urging the pawl toward the star wheel, and means operated by the eccentric and exerting pressure thereon tending to cause the eccentric to overrun the star wheel.

7. As a new article of manufacture, a star wheel having a plurality of teeth, each comprising two lateral faces and an outer peripheral portion extending between said faces, one lateral face of the respective teeth being disposed at an angle to that radius which bisects the outer portion of the tooth and the vertex of such angle being within the periphery of the wheel, the other lateral face of the respective teeth being substantially parallel to said radius.

8. As a new article of manufacture, a star wheel having a plurality of teeth each comprising two lateral faces and an outer peripheral portion connecting said faces, the lateral faces of the teeth being inclined in the same general direction and the degree of inclination of said faces being different.

In witness whereof, I hereunto subscribe my name this 20th day of June, 1928.

RUDOLPH W. JANDA.